(12) United States Patent
Mindrum et al.

(10) Patent No.: US 7,657,835 B2
(45) Date of Patent: Feb. 2, 2010

(54) METHOD AND SYSTEM FOR CREATING A COMMEMORATIVE PRESENTATION

(75) Inventors: Gordon Scott Mindrum, Cincinnati, OH (US); Steven Craig Sefton, West Chester, OH (US); Jeffrey Jon Johnson, West Chester, OH (US)

(73) Assignee: Making Everlasting Memories, L.L.C., Cincinnati, OH (US)

( * ) Notice: Subject to any disclaimer, the term of this patent is extended or adjusted under 35 U.S.C. 154(b) by 795 days.

(21) Appl. No.: 10/446,988

(22) Filed: May 28, 2003

(65) Prior Publication Data

US 2003/0197721 A1   Oct. 23, 2003

Related U.S. Application Data

(63) Continuation of application No. 10/051,555, filed on Jan. 17, 2002, which is a continuation of application No. 09/016,825, filed on Jan. 30, 1998, now Pat. No. 6,340,978.

(60) Provisional application No. 60/037,010, filed on Jan. 31, 1997.

(51) Int. Cl.
    *G06F 3/00* (2006.01)
(52) U.S. Cl. ................ 715/719; 715/720; 715/721; 715/722; 715/723
(58) Field of Classification Search ......... 715/716–733, 715/838; 725/80, 100, 46, 35, 112, 113; 345/418, 419
    See application file for complete search history.

(56) References Cited

U.S. PATENT DOCUMENTS

| | | | |
|---|---|---|---|
| 3,928,928 A | 12/1975 | Kalust | |
| 4,169,970 A | 10/1979 | Opiela et al. | |
| 4,304,076 A | 12/1981 | Splendora | |
| 4,698,682 A | 10/1987 | Astle | |
| 5,099,422 A * | 3/1992 | Foresman et al. | 705/1 |
| 5,099,846 A * | 3/1992 | Hardy | 600/407 |
| 5,119,474 A | 6/1992 | Beitel et al. | |
| 5,157,511 A * | 10/1992 | Kawai et al. | 386/68 |

(Continued)

FOREIGN PATENT DOCUMENTS

WO   WO 01/29736 A2   4/2001

OTHER PUBLICATIONS

Office Action dated Apr. 18, 2005 for U.S. Appl. No. 10/051,555, filed Jan. 17, 2002.

(Continued)

*Primary Examiner*—Tadeese Hailu
(74) *Attorney, Agent, or Firm*—Frost Brown Todd LLC (57) ABSTRACT

A method and system for creating a commemorative presentation. The subject of the commemoration can take a variety of forms, including living or deceased individuals, organizations, entities, companies, cities, and the like. A plurality of images are compiled related to the subject. Configuration data is created relating to the display of the plurality of images. The plurality of images and configuration data are stored in a database. A video is dynamically created by accessing the plurality of images and configuration data stored in the datastore and sequentially displaying the plurality of images stored in the datastore in conformance with the configuration data stored in the datastore. While the invention has utility in a number of different applications, one particularly well suited application is in the death care industry for creating commemorative videos for the recently deceased.

36 Claims, 11 Drawing Sheets

U.S. PATENT DOCUMENTS

| | | | | |
|---|---|---|---|---|
| 5,227,863 | A | 7/1993 | Bilbrey et al. | |
| 5,249,294 | A | 9/1993 | Griffin, III et al. | |
| 5,278,662 | A * | 1/1994 | Womach et al. | 386/54 |
| 5,307,456 | A | 4/1994 | MacKay | |
| 5,350,303 | A * | 9/1994 | Fox et al. | 434/118 |
| 5,404,343 | A | 4/1995 | Boggio | |
| 5,442,749 | A * | 8/1995 | Northcutt et al. | 709/219 |
| 5,459,819 | A | 10/1995 | Watkins et al. | |
| 5,473,744 | A * | 12/1995 | Allen et al. | 715/273 |
| 5,485,611 | A * | 1/1996 | Astle | 707/1 |
| 5,524,193 | A * | 6/1996 | Covington et al. | 715/512 |
| 5,526,480 | A | 6/1996 | Gibson | |
| 5,530,862 | A * | 6/1996 | Wadsworth et al. | 713/1 |
| 5,550,735 | A * | 8/1996 | Slade et al. | 700/99 |
| 5,561,604 | A * | 10/1996 | Buckley et al. | 700/235 |
| 5,569,880 | A | 10/1996 | Galvagni et al. | |
| 5,594,661 | A * | 1/1997 | Bruner et al. | 725/87 |
| 5,598,388 | A * | 1/1997 | Van Maren et al. | 369/59.25 |
| 5,602,582 | A * | 2/1997 | Wanderscheid et al. | 725/139 |
| 5,604,855 | A | 2/1997 | Crawford | |
| 5,606,359 | A * | 2/1997 | Youden et al. | 725/88 |
| 5,615,937 | A | 4/1997 | Bellanger | |
| 5,629,980 | A | 5/1997 | Stefik et al. | |
| 5,630,067 | A * | 5/1997 | Kindell et al. | 709/231 |
| 5,640,320 | A * | 6/1997 | Jackson et al. | 700/87 |
| 5,644,714 | A * | 7/1997 | Kikinis | 709/219 |
| 5,646,866 | A * | 7/1997 | Coelho et al. | 715/716 |
| 5,649,185 | A * | 7/1997 | Antognini et al. | 707/9 |
| 5,651,117 | A | 7/1997 | Arbuckle | |
| 5,659,732 | A | 8/1997 | Kirsch | |
| 5,666,215 | A * | 9/1997 | Fredlund et al. | 358/487 |
| 5,680,639 | A | 10/1997 | Milne et al. | |
| 5,696,488 | A * | 12/1997 | Assisi | 340/539.11 |
| 5,696,901 | A * | 12/1997 | Konrad | 709/203 |
| 5,703,995 | A * | 12/1997 | Willbanks | 386/52 |
| 5,706,457 | A * | 1/1998 | Dwyer et al. | 715/835 |
| 5,717,869 | A | 2/1998 | Moran et al. | |
| 5,721,878 | A * | 2/1998 | Ottesen et al. | 725/87 |
| 5,729,741 | A * | 3/1998 | Liaguno et al. | 707/104.1 |
| 5,729,921 | A | 3/1998 | Rojas | |
| 5,732,231 | A * | 3/1998 | Evans, III | 715/716 |
| 5,732,515 | A | 3/1998 | Rodrigues et al. | |
| 5,740,388 | A * | 4/1998 | Hunt | 715/723 |
| 5,745,710 | A * | 4/1998 | Clanton et al. | 725/60 |
| 5,751,281 | A | 5/1998 | Hoddie et al. | |
| 5,751,883 | A * | 5/1998 | Ottesen et al. | 386/27 |
| 5,760,767 | A | 6/1998 | Shore et al. | |
| 5,760,838 | A | 6/1998 | Adams et al. | |
| 5,761,404 | A * | 6/1998 | Murakami et al. | 714/15 |
| 5,761,684 | A | 6/1998 | Gibson | |
| 5,778,306 | A * | 7/1998 | Kommrusch | 455/78 |
| 5,798,759 | A | 8/1998 | Dahl | |
| 5,799,318 | A * | 8/1998 | Cardinal et al. | 707/101 |
| 5,813,009 | A * | 9/1998 | Johnson et al. | 707/101 |
| 5,815,149 | A | 9/1998 | Mutschler et al. | 715/762 |
| 5,818,439 | A * | 10/1998 | Nagasaka et al. | 725/87 |
| 5,819,092 | A | 10/1998 | Ferguson et al. | |
| 5,819,250 | A * | 10/1998 | Trader et al. | 707/1 |
| 5,828,904 | A | 10/1998 | Batson et al. | |
| 5,831,747 | A | 11/1998 | Salgado | |
| 5,832,283 | A | 11/1998 | Chou et al. | |
| 5,852,435 | A * | 12/1998 | Vigneaux et al. | 345/428 |
| 5,861,881 | A * | 1/1999 | Freeman et al. | 715/201 |
| 5,892,905 | A * | 4/1999 | Brandt et al. | 726/11 |
| 5,903,664 | A | 5/1999 | Hartley et al. | |
| 5,909,551 | A * | 6/1999 | Tahara et al. | 709/231 |
| 5,913,218 | A * | 6/1999 | Carney et al. | 707/200 |
| 5,926,624 | A * | 7/1999 | Katz et al. | 709/217 |
| 5,930,493 | A * | 7/1999 | Ottesen et al. | 725/92 |
| 5,930,810 | A | 7/1999 | Farros et al. | |
| 5,946,445 | A * | 8/1999 | Peters et al. | 386/52 |
| 5,949,411 | A * | 9/1999 | Doerr et al. | 715/716 |
| 5,953,005 | A * | 9/1999 | Liu | 715/243 |
| 5,956,716 | A * | 9/1999 | Kenner et al. | 707/10 |
| 5,963,202 | A * | 10/1999 | Polish | 715/723 |
| 5,966,121 | A * | 10/1999 | Hubbell et al. | 715/726 |
| 5,977,946 | A * | 11/1999 | Mizobata | 345/418 |
| 5,982,979 | A * | 11/1999 | Omata et al. | 386/69 |
| 5,983,200 | A | 11/1999 | Slotznick | |
| 5,987,476 | A * | 11/1999 | Imai et al. | 707/201 |
| 6,003,032 | A | 12/1999 | Bunney et al. | |
| 6,006,242 | A | 12/1999 | Poole et al. | |
| 6,017,157 | A * | 1/2000 | Garfinkle et al. | 396/639 |
| 6,028,603 | A * | 2/2000 | Wang et al. | 715/776 |
| 6,054,423 | A * | 4/2000 | McGill | 510/191 |
| 6,061,532 | A * | 5/2000 | Bell | 396/661 |
| 6,064,979 | A | 5/2000 | Perkowski | |
| 6,065,002 | A | 5/2000 | Knotts et al. | |
| 6,081,262 | A * | 6/2000 | Gill et al. | 715/202 |
| 6,084,581 | A * | 7/2000 | Hunt | 715/202 |
| 6,094,671 | A * | 7/2000 | Chase et al. | 709/201 |
| 6,135,646 | A * | 10/2000 | Kahn et al. | 709/217 |
| 6,154,600 | A * | 11/2000 | Newman et al. | 386/4 |
| 6,159,016 | A * | 12/2000 | Lubell et al. | 434/247 |
| 6,202,061 | B1 * | 3/2001 | Khosla et al. | 707/3 |
| 6,208,995 | B1 | 3/2001 | Himmel et al. | |
| 6,264,032 | B1 | 7/2001 | Hobbs | |
| 6,374,260 | B1 * | 4/2002 | Hoffert et al. | 707/104.1 |
| 6,414,663 | B1 | 7/2002 | Manross, Jr. | |
| 6,463,205 | B1 * | 10/2002 | Aschbrenner et al. | 386/52 |
| 6,487,538 | B1 | 11/2002 | Gupta et al. | |
| 6,489,980 | B1 * | 12/2002 | Scott et al. | 715/854 |
| 6,544,293 | B1 * | 4/2003 | Ohanian | 715/500.1 |
| 6,560,651 | B2 * | 5/2003 | Katz et al. | 709/229 |
| 6,628,303 | B1 * | 9/2003 | Foreman et al. | 715/723 |
| 6,652,456 | B2 * | 11/2003 | Gelfand et al. | 600/300 |
| 6,742,161 | B1 * | 5/2004 | James et al. | 715/500 |
| 6,891,633 | B1 * | 5/2005 | Hayward et al. | 358/1.15 |
| 6,895,557 | B1 * | 5/2005 | Wood et al. | 715/744 |
| 6,973,453 | B2 * | 12/2005 | Culp et al. | 707/5 |
| 7,215,434 | B1 * | 5/2007 | Janse et al. | 358/1.15 |
| 2002/0072925 | A1 | 6/2002 | Krim | |
| 2003/0009461 | A1 * | 1/2003 | Notargiacomo et al. | 707/10 |

OTHER PUBLICATIONS

Office Action dated Mar. 14, 2005 for U.S. Appl. No. 09/829,863, filed Apr. 10, 2001.
Screenshots from Legacy.com, publication date unkown.
Office Action dated May 7, 2003 for U.S. Appl. No. 09/829,863, filed Apr. 10, 2001.
Office Action dated Jan. 9, 2004 for U.S. Appl. No. 09/829,863, filed Apr. 10, 2001.
Office Action dated Mar. 25, 2004 for U.S. Appl. No. 09/829,863, filed Apr. 10, 2001.
Office Action dated Oct. 21, 2004 for U.S. Appl. No. 10/051,555, filed Jan. 17, 2002.
Leif Technologies, Inc., World Wide Web page; View.cndot.logy.TM, Memorials That Tell a Story, Copyright 1997.
Funeral Monitor, Jan. 20, 1997, vol. 6, No. 3.
The Grateful Dead Can Tell Their Story: Just Click a Mouse, Elizabeth Seay, Wall Street Journal Mar. 16, 1998.
Screen shots from www.memories-by-design.com web site.
Screen shots from www.shockwave.com/sw/content/photojam web site.
Screen shots from PhotoJam 3 software.

* cited by examiner

| General Info | Contact Info | Biography | Photos | Tributes | Movie | Approve |

Enter Information for this Life Story

This Life Story is: Published

☐ To be considered for the featured life story, click in the box.

First Name*: N.

Middle Name:

Last Name*: Spiron

Title: Mr.

Prefix:

Suffix: IV

Maiden Name:

Date of Birth: October / 10 / 1884

Date of Death (if applicable): October / 10 / 1994

Place of Birth City:

Place of Birth State/Prov:

Place of Death City (if applicable):

Place of Death State/Prov (if applicable):

Notes: (This field is not published)

Created by steve on 3/5/2003 at 3:00:40 PM ET

Previous    STEP 1 of 7    Next        Cancel    Save    Exit    Help    Preview

FIG. 4

| General Info | Contact Info | Biography | Photos | Tributes | Movie | Approve |

Purchaser/Contact Information

First Name
Michael

Middle Name

Last Name
Dell

Title ▾  Prefix ▾  Suffix ▾  Maiden Name  Gender ▾

Street Address
8000 Dell Way

City
Dallas

State/Province
Texas ▾

Postal Code
76543

Country
United States ▾

Phone Number
☐ - ☐ - ☐

Email Address
steve.sefton@mem.com

Fax Number
☐ - ☐ - ☐

Previous  STEP 2 of 7  Next     Cancel  Save  Exit  Help  Preview

FIG. 5

| General Info | Contact Info | Biography | Photos | Tributes | Movie | Approve |

Enter or Update Biography Text

*Add biographical, memories, historical, or genealogical text below

[ Check Spelling ]  [ Spelling Options ]

*You can cut and paste text from a word processor*
        To Copy Text: Highlight text and press Ctrl-c
        To Paste Text: Place cursor in the desired location and press Ctrl-v Click here to Send an obituary to a Newspaper Previous    STEP 3 of 7    Next        Cancel    Save    Exit    Help    Preview

| General Info | Contact Info | Biography | Photos | Tributes | Movie | Approve |

Approve and Publish

Please select appropriate option below.

- ⦿ Publish this to the web.
- ○ Publish this to the web and make private.
- ○ Requires more work, do not publish yet.

[ Done ]

Previous    STEP 7 of 7    Next          Cancel    Save    Exit    Help    Preview

METHOD AND SYSTEM FOR CREATING A COMMEMORATIVE PRESENTATION

RELATED APPLICATIONS

This application is a continuation in part of application Ser. No. 10/051,555 filed Jan. 17, 2002, which is a continuation of application Ser. No. 09/016,825 filed Jan. 30, 1998 (issued as U.S. Pat. No. 6,340,978), which claims the benefit of application Ser. No. 60/037,010 filed Jan. 31, 1997.

FIELD OF THE INVENTION

The present invention relates in general to computer systems for creating commemorative presentations, with an illustrative embodiment being described in the context of commemorative videos for use in the death care industry.

BACKGROUND

Throughout history and across cultural divisions, a variety of different ceremonies and memorials have been used to commemorate the death of a loved one. Indeed, ceremonies and memorials have become integral for helping the living cope with the death and for commemorating the loved one for future generations. For instance, traditional western ceremonies typically involve a funeral home visitation, a burial, and a wake, with the grave site being marked by a headstone. In the case of cremation, ashes are often placed in a sealed urn. For many historically significant individuals, their deaths are sometimes commemorated with a memorial, such as a statue, which is often dedicated years after that individual's death.

While traditional ceremonies and memorials are without a doubt important, they do have several shortcomings. For instance, visitors have traditionally been required to be physically located at the ceremony or the memorial to view or reflect on the individual. If you are not physically present at the ceremony or the memorial, you cannot share in the achievements and memories associated with the individual. In the case of many ceremonies, the duration is limited to the actual time of the ceremony. Any reflection after the ceremony is limited to the memories of those who actually attended. A further shortcoming is the relatively limited scope of the commemoration. Visitations typically involves a eulogy and memories shared between the participants. Outside the spoken words of the visitors, however, little or no other memories are shared. In the case of traditional memorials, including headstones, urns, statues and the like, memories and messages are usually limited only to a few words etched in stone or on a plaque.

Related U.S. Pat. No. 6,340,978 (hereby incorporated in its entirety by reference) discloses, among other things, a user interface on a computer system that displays information about an entity, such as a person, a business, a pet, a country, etc. The screen is associated with the entity. A plurality of recordations are associated with the entity. The recordations are of at least two different types and are associated with the period of time. A plurality of selection mechanisms are on the screen. Each of the selection mechanisms are associated with at least one type of recordation. A time selection mechanism is adapted for selecting a period of time. The time selection mechanism is associated with at least a portion of the plurality of recordations and is operative to present one or more recordations that correspond with the selected period of time. The user interface can be accessed over a computer, either as a stand-alone or over a network, whereas on a memorial such as in a headstone.

The present invention provides a novel method and system for creating and presenting commemorative videos. While the invention has particularly utility and benefit in the death care industry (e.g. for creating and presenting commemorative videos about a deceased loved one), it will be readily appreciated that the invention offers many benefits, uses, and applications, both in the death care industry and in other industries or applications.

SUMMARY

One aspect of the present invention relates to a method and system for creating a commemorative presentation. The subject of the commemoration can take a variety of forms, including living or deceased individuals, organizations, entities, companies, cities, and the like. A plurality of images are compiled related to the subject. Configuration data is created relating to the display of the plurality of images. The plurality of images and configuration data are stored in a datastore. A video is dynamically created by accessing the plurality of images and configuration data stored in the datastore and sequentially displaying the plurality of images stored in the datastore in conformance with the configuration data stored in the datastore.

One embodiment of the present invention is a method of creating a commemorative presentation. A plurality of images are compiled related to a subject. Configuration data is created relating to the display of the plurality of images. The plurality of images and configuration data is stored in a datastore. A video is created by accessing the plurality of images and configuration data stored in the datastore and sequentially displaying the plurality of images stored in the datastore in conformance with the configuration data stored in the datastore. The video is displayed to commemorate the subject.

Another embodiment of the invention is a method in conjunction with funeral services. Identifying data is created for a plurality of deceased persons, the identifying data being unique to each deceased person relative to a plurality of other deceased persons. A plurality of images are compiled related to each of the plurality of deceased persons. For each of the plurality of deceased persons, a plurality of video display options are selected relating to the sequence and presentation of the plurality of images. Configuration data is created for each of the plurality of deceased persons corresponding to the selected video display options. For each of the plurality of deceased persons, the corresponding plurality of images, configuration data, and identifying data are stored in a datastore. A commemorative video for a selected deceased person is requested to be created. The plurality of images and configuration data stored in the datastore are accessed by referencing the identifying data for the selected deceased person. A commemorative video is created for the selected deceased person by sequentially displaying the corresponding plurality of images stored in the datastore in conformance with the corresponding configuration data stored in the datastore. The commemorative video is displayed during the funeral service of the selected deceased person.

Yet another embodiment of the invention is a system for commemorating a deceased person. A plurality of images are related to the deceased person. Software is operable for creating and editing configuration data relating to the sequence and presentation of the plurality of images. A datastore stores a the plurality of images and configuration data. The system includes a means for creating a video by sequentially displaying the plurality of images stored in the datastore in conformance with the configuration data stored in the datastore. The system also includes a means for displaying the video during the funeral service for the deceased person.

Still another embodiment of the invention is an image submission system for uploading images from a client to a remote server. A scanner is connected to the client operable to scan images. A scanner interface software module is loaded on the client for operating the scanner. An image submission software module is loaded on the server and being operable to remotely receive instructions and be viewed by the client on an Internet browser, the image submission software module comprising a single click user option to scan and upload images. A control software module is loaded on the client in communication with the image submission software module, said control software module being operative, upon the selection of the option to scan and upload images, to direct the scanner interface software module to scan an image on the scanner and upload the scanned image to the remote server.

Still other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

BRIEF DESCRIPTION OF THE DRAWINGS

While the specification concludes with claims which particularly point out and distinctly claim the invention, it is believed the present invention will be better understood from the following description taken in conjunction with the accompanying drawings, in which like reference numerals identify the same elements and in which:

DETAILED DESCRIPTION

While the following detailed description illustrate specific applications of the present invention in the context of the death care industry, it is contemplated that the concepts and ideas described herein have equal utility and uses in other applications.

Figure 1:
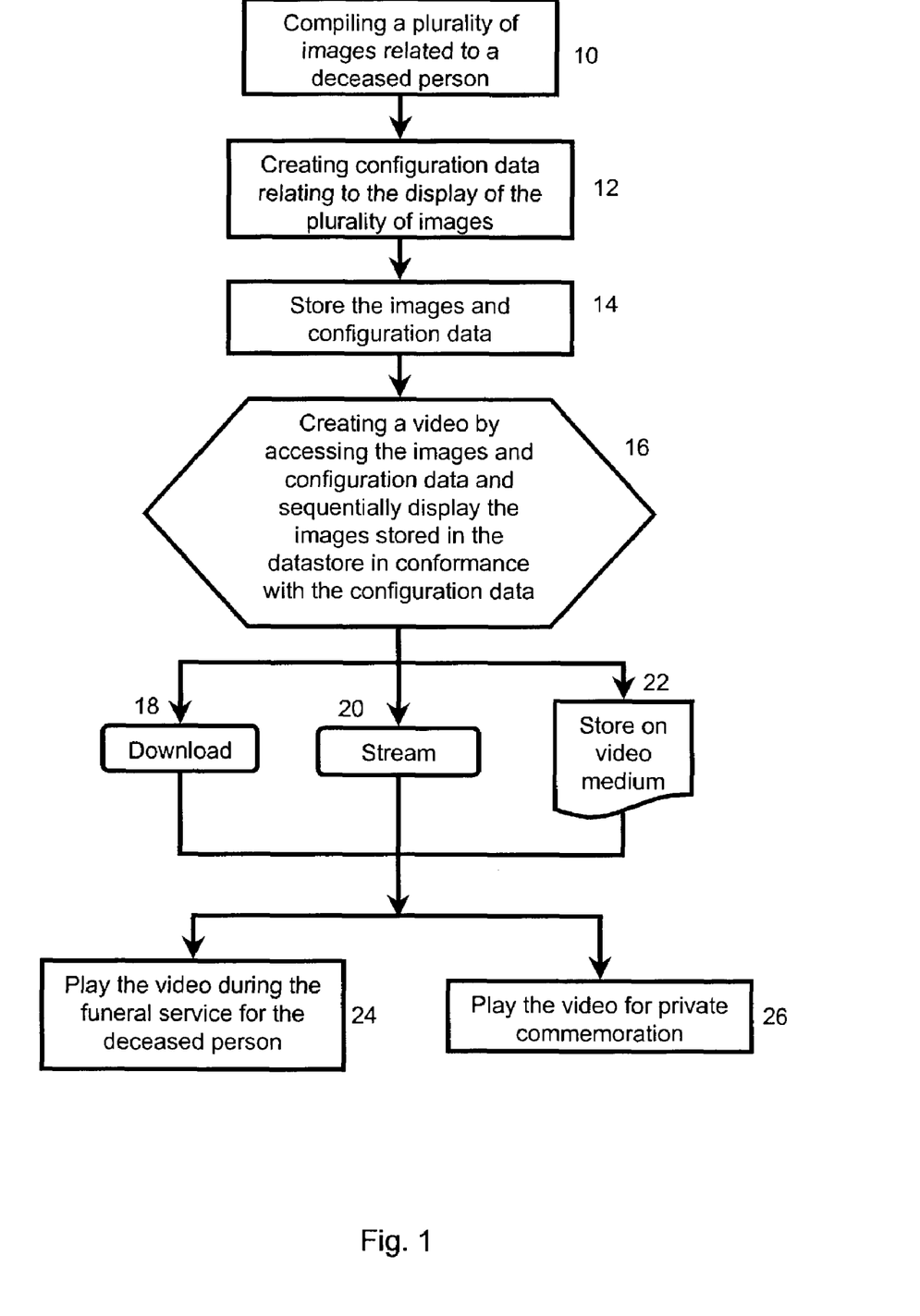
FIG. 1 illustrates a flowchart for creating and displaying a commemorative video.
Figure 2:
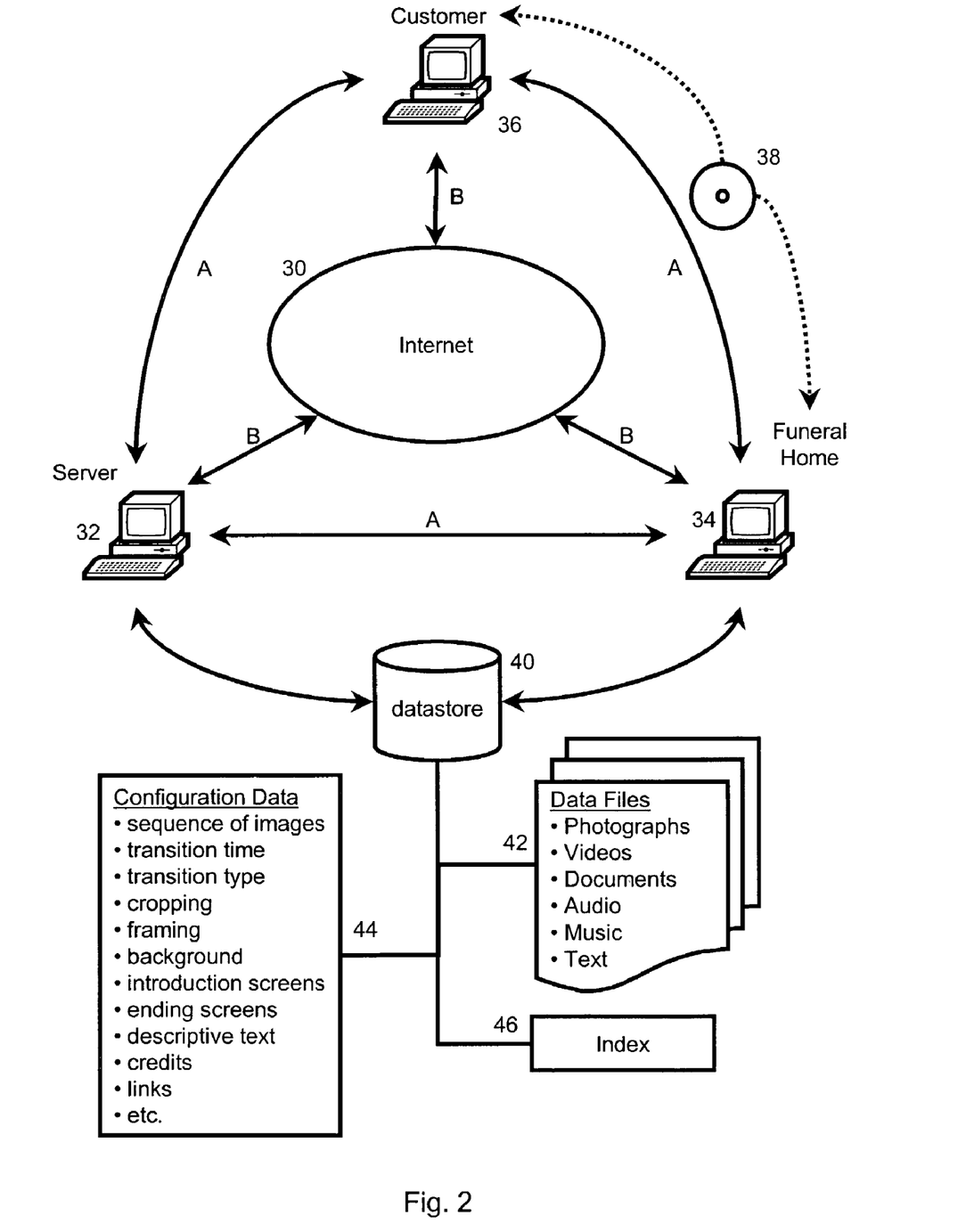
FIG. 2 illustrates a schematic diagram of a system for creating and displaying commemorative videos.

FIGS. 1 and 2 illustrate examples of the invention in which a deceased person is commemorated at a funeral service and afterwards. At step (10), a plurality of images related to the deceased people are compiled. This step (10) will often involve the customer (36), who in many cases will be a relative of loved one of the deceased, gathering images related to the deceased person. The images can take a variety of forms, including photographic still images, video images, drawings or paintings, documents, and the like. If the images are not in a digital format, it is preferred that they be converted to digital files using techniques known in the art. For instance, it is contemplated that the funeral home (34) would include a workstation with digital scanner where the customer could scan images into a digital format. Alternatively, the customer (36) could scan the images at home or other location. Typically, the images are submitted to the funeral home (34) or the server (32). The submission can be by physically delivering (e.g. hand deliver, mail, etc.) the images or by electronic submission via peer-to-peer or network connections (A), over the Internet (30) via Internet connections (B), or a combination of both.

At step (12), configuration data is created relating to the display of the images. The configuration data defines at least in part how the submitted images will be displayed in a commemorative video. The configuration data will preferably include one or more configuration templates that may be modified to customize the commemorative video based on a customer's (36) preferences. For instance, the customer (36) may select a variety of different video display options through an appropriate user interface. The configuration data can be specific to one or more images and/or apply globally to the entire video. As such, the type of configuration data being created can vary substantially based on the variety of options and type of commemorative video. In one embodiment, the video comprises a sequential display of the compiled images. In such case, the configuration data (44) can include the sequence of images to be displaying in the video. The configuration data (44) can also include the time period between image transitions in the video. For instance, each image could have a user defined display time. The configuration data (44) can also include the type of transition of the images (e.g. fading, blinds, box, checkerboard, cover, uncover, wipe, cut, dissolved, random bars, split, strips, and other transition techniques known in the slideshow art). In some cases, the configuration data (44) can include panning and zooming parameters for the images. The configuration data (44) may also include user-specified frames for the images, and background music, colors, patterns and animations. The configuration data (44) may also include introductory and ending screens (e.g. featuring text and graphics that may or may not include images) and appropriate credits. The configuration data (44) may also include text or notes to accompany or describe the images, the deceased person, or tributes to the deceased person. The configuration data (44) may also include links to other sources of data, whether within or external to the datastore (40). For instance, the links could include data relating to organizations to which the deceased may have been affiliated. So, for example, if the deceased was a fire fighter, the corresponding configuration data (44) may include links to images or other data relating to the fire department which may be included in the video.

At step (14), the images and configuration data are stored for later retrieval. In the present example, the images are stored in a datastore (40) as data files (42), and the configuration data (44) populates fields in the datastore (40) or other files referred to in the datastore (40). In addition, step (14) may also include may also include storing, text, and music files as data files (42). For instance, a narration directed to the deceased could be saved as an audio file. In the present example, the datastore (40) is a relational database, but other types of data storage may also be employed including without limitation object oriented or hierarchical datastores and other digital data storage and retrieval techniques known in the art. Depending on how the system is step up, the datastore (40) can be accessed by the server (32) or the funeral home (40). For instance, if the system is operated as an application service provider ("ASP") or otherwise as a third party service, the datastore (40) would be accessed by the server (32). As a further example, the system could be operated locally at the funeral home (34) in which case it would be desirable for the funeral home (34) to directly access the datastore (40).

In one embodiment, the datastore (40) contains data for a plurality of deceased persons. In such case, the data files (42) and configuration data (44) are referenced by an index (46). In the present example, the index (46) includes a unique identifying data for each deceased person. For instance, the identifying data can be numeric, alpha or alphanumeric value (e.g. a serial number, customer number, a portion of the person's name, and the like). By referencing the identifying data in the index (46) (or other index data), the data files (42) and configuration data (44) associated with a desired deceased person can be readily accessed. Accordingly, the datastore (40) can store data files (42) and configuration data (44) for a large number of deceased persons. The datastore (40) can include deceased persons associated with a single funeral home or a plurality of funeral homes over a broad geography. It is further contemplated that one or more of the deceased persons may not be associated with a funeral home at all.

One with ordinary skill in the art will readily recognize that the steps (10-14) may be performed sequentially or non-sequentially. Furthermore, the steps (10-14) may be performed all at once or piecemeal. For instance, images may be compiled and/or stored in multiple sessions over a period of time, and likewise the configuration data may be created and altered over multiple sessions over a period of time.

At step (16), a video (i.e. a multimedia presentation comprising changing visual images) is created by accessing the data files (42) and configuration data (44) stored in the datastore (40) and sequentially displaying images in conformance with the configuration data (44). In addition, configuration data (44) may also reference other types of data files (42), such as music, audio, text, etc., which would also be included in the video. Accordingly, the video is created dynamically or "on the fly" by directly accessing the information stored in the datastore (40). Because the video is created dynamically, the video can be readily modified (e.g. by adding or deleting images or changing the configuration data) and the modified video can be quickly viewed. The video format can take a variety of forms. In one embodiment, the video is a MACROMEDIA FLASH movie, however, other formats are also contemplated including without limitation SHOCKWAVE, DIRECTOR, MPEG, AVI, ASF, REAL MEDIA, QUICKTIME, DVD, video CD, and the like. In addition, the video may be created in more than one format based on one's preferences.

Steps (18, 20 and 22) illustrate three examples of how the created video can be delivered for viewing, none of which are mutually exclusive of the other. The video can be downloaded (18) or streamed (20) via the connections (A or B). Alternatively the video can be stored as (22) on a physical video medium (38) (e.g., video-tape, compact disc (CD), digital video disc (DVD), or other formats known in the art). If the video medium (38) is created at a remote location, it can then be to the customer (36), funeral home (34), or any other third party. Depending on the method of delivery (18, 20 and 22) and the recipient's preferences, it may be necessary to first convert the video format. Once delivered, the video is preferably viewed (24) during the funeral service for the deceased person. For instance, the step (24) may include playing the video during one or more of the following services: visitation, mass, burial, cremation, graveside, memorial, or other commemorative service for the recently deceased. The location of the funeral service may vary, including without limitation at the funeral home, a church, an individual's home, a hall, and the like. In addition or in the alternative, the video is viewed (26) by the customer (36) or other third party for private commemoration or remembrance of the deceased. The form of video delivery (18, 20, 22) can be different for the various viewings (24, 26). For instance, the video may be downloaded (18) or stored on a video medium (38) for viewing at the service (24) and later streamed (20) over the Internet (30) for subsequent viewing (26). As a further example, one party could stream (20) the video for their private viewing (26) while a different party could-obtain a video medium (38) for their private viewing (26). In addition to the delivery steps (18-22), it is also contemplated that the video could be converted and delivered in other media formats, such as a interactive electronic version of the video, a static copy of the video content (e.g. a printed or electronic book or album of the images and text), and the like.

Figure 3:
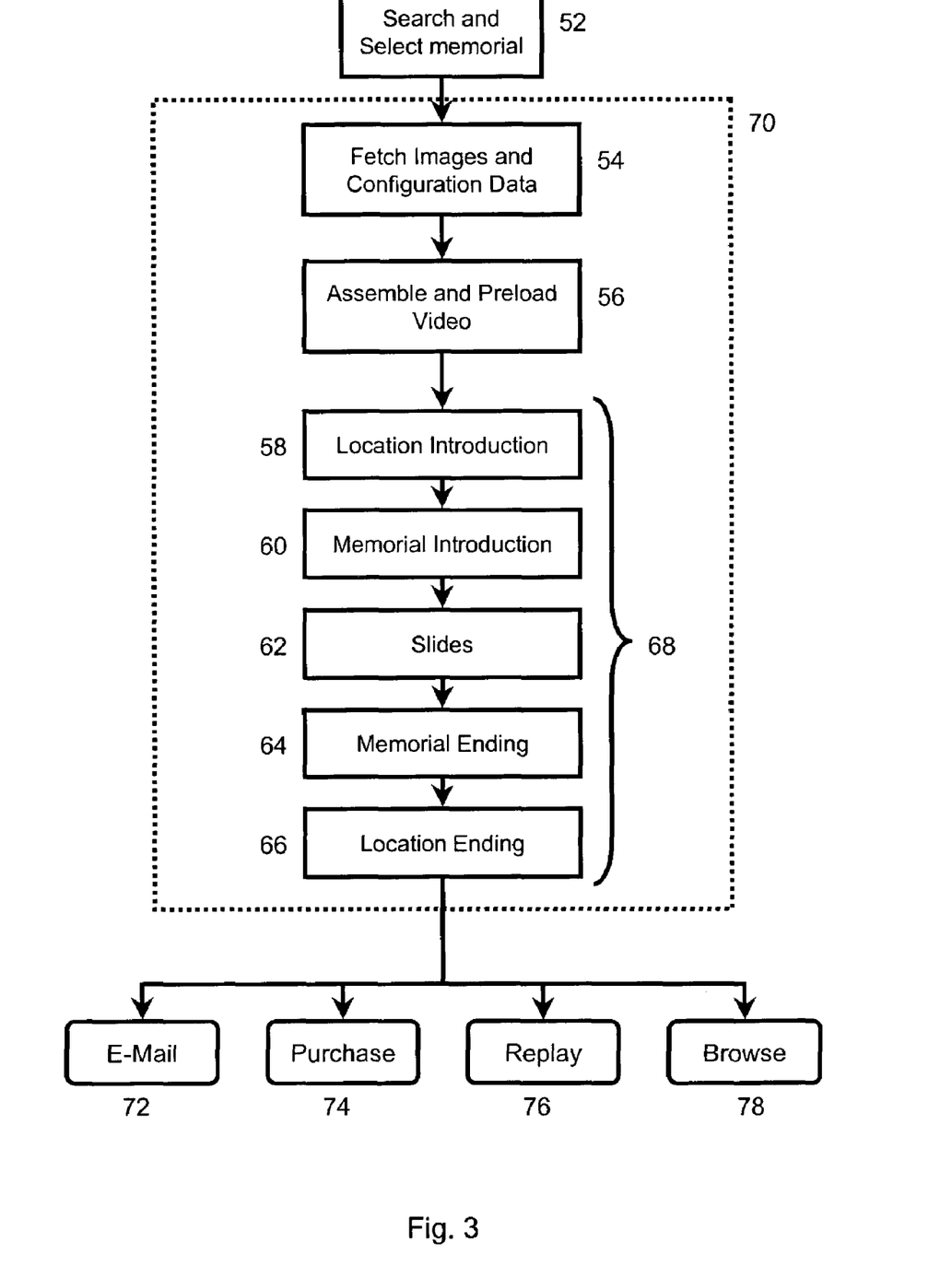
FIG. 3 illustrates a flowchart for creating and displaying a commemorative video.

FIG. 3 illustrates an example of a method for viewing a commemorative video in the context of an ASP model run over the Internet (30) on the server (32). For instance, a user (e.g. customer (36), funeral home (34), or other third party) could access over the Internet (30) a web site hosted by the server (32). At step (52), the web site provides a suitable user interface wherein the user may search and select the deceased person of whom they wish to view the commemorative video. This step (52) will often involve querying the index (46) for a desired person. Alternatively, the step (52) may involve browsing and selecting one or more persons in a list. Generally, this step (52) would also involve an option such as "Play Video" to trigger the next steps. Optionally, the video for a given person may be password protected. In addition to the option to view a video, it is further contemplated that other commemorative presentations for the deceased, including for example, the life story, archive service and growing memories discussed in U.S. Pat. No. 6,340,978.

The block of steps (70) are an example of the video creation process. While this process (70) is applicable for the ASP service or other applications of the present invention, the video creation process is not limited to this particular embodiment. The process (70) is preferably executed in the server (32), however, steps may also be performed on client machines. At step (54), the images (42) and configuration data (44) are fetched from the datastore (40). If the datastore (40) contains information about multiple deceased persons, appropriate identifying data from the index (46) may be referenced. At step (56), the video is assembled and preloaded. While the feature of preloading is optional, it provides the benefit of allowing a portion of the video to be loaded and played while the remainder of the video is being created.

The next block of steps (58-66) indicate the sequence of the actual commemorative video (68) of the present embodiment. The video (68) may include all or a portion of the listed components, and may include additional components as well. The information and sequence of the video (68) is defined by the configuration data (44) and the images (42). Step (58) includes an introductory screen or sequence of screens related to a location. For example, the location introduction (58) could be unique to the funeral home (34), the service provider of the ASP services, and the like. Step (60) is an introductory screen or sequence of screens introducing the commemorative video and the deceased person. The introductions (58, 60) can take any one of a variety of forms including for example text, audio, images and the like.

Step (62) is a sequence of slides from the images (42). The slides are sequentially displayed in conformance with the configuration data (44). Each slide comprises one or more images (42) and may additionally include other information, such as backgrounds, text, animations and the like. Step (64) involves placing one or more ending screens relating to the commemorative video and deceased person. Step (66) involves one or more ending screens related to the location. Similar to the introduction screens (58), (60), the ending screens (64), (66) can take a variety of different forms based on ones preferences.

Optionally, while the video (68) is being played a control panel is available to use. The control panel preferable resembles the buttons to control a DVD or VCR, including options such as play, pause, rewind, fast forward, skip forward, skip backwards, stop, and the like. The control panel may be displayed on the screen or be hidden. Alternatively, the control panel may be embodied as keyboard commands.

In the present embodiment, after the video (68) is concluded, or while the video (68) is being played, a variety of options are available to the user. One option involves emailing (72) a worldwide web link to the web page or the video (68) itself, or on the alternative, attaching the created video (68) as a file to an email. Option (74) allows the end user to purchase a copy of the video (68) on a video medium. Upon selecting the purchase option (74), the user will be prompted for payment information, delivery location and video format. The replay option (76) allows the user to replay the video (68). The replay option (76) may either loop back to step (54) in which case the video is recreated or alternatively the video (68) is stored and replayed directly from step (58). The browse option (78) loops the user back to step (52), in which the user may browse other video memorials for other people.

FIGS. 4-11 illustrate examples of a data entry tool ("DE Tool") in which a user can upload and manage images (42) and configuration data (44) used for a video. In addition the DE Tool may also be used for managing information that would go into other commemorative presentations and for other uses. Naturally, this illustration of a DE Tool and its user interface is only one example, and many variations or other embodiments are also contemplated. The DE Tool of the present example is run on the server (32) and presented to users over the Internet (30) as page viewable on most browsers. It should be recognized, however, that the user interface of the DE Tool can take a variety of other forms, including but not limited to a locally executed program, a JAVA or ACTIVE X applet, and other user interfaces known in the art.

Figure 4:
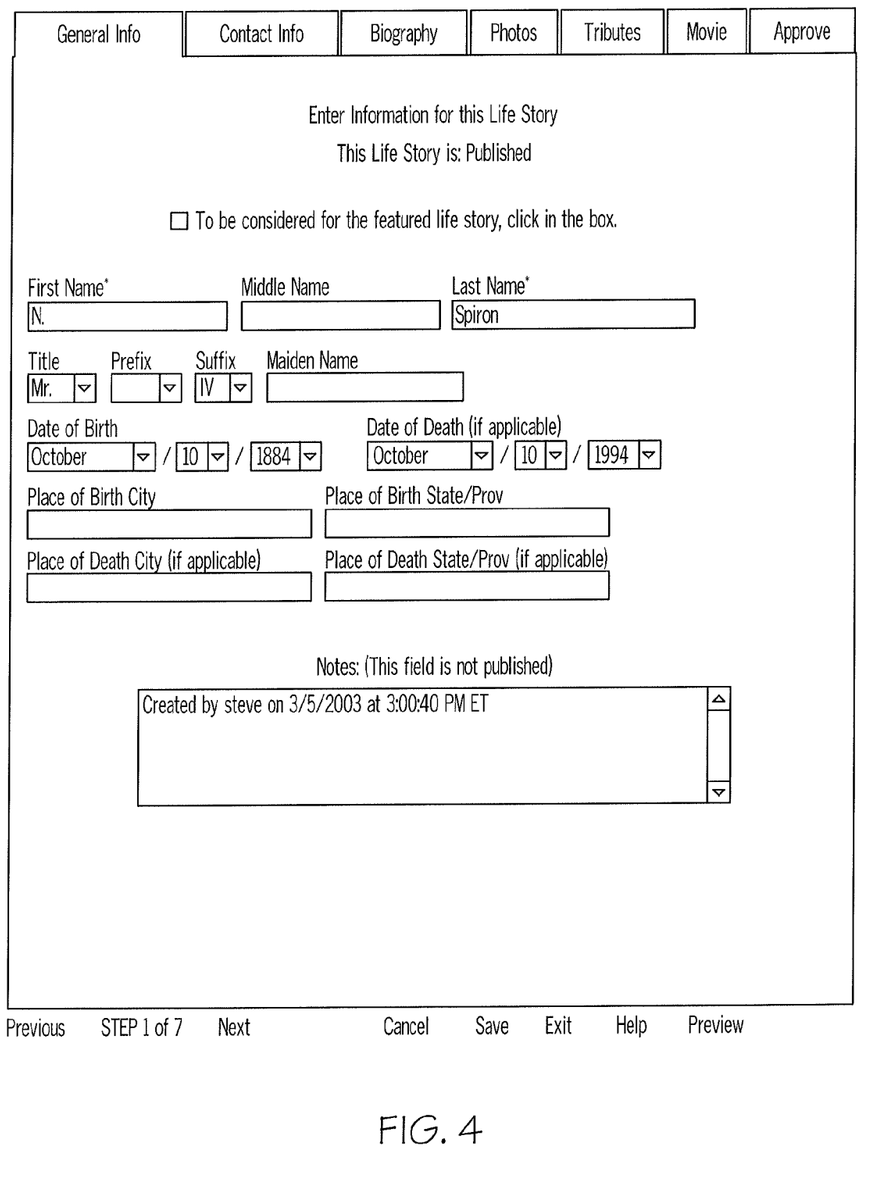
FIG. 4 illustrates a screen shot of General Info view of a data entry tool.

Turning to FIG. 4, the DE Tool includes several tab options along the top. In this embodiment, the DE Tool includes tabs for General Info, Contact Info, Biography, Photos, Tributes, Movie, and Approve. As shown in FIG. 4, the General Info tab is selected. In this screen, general information about the deceased person is entered including information such as the person's name, date and place of birth, date and place of death, and a general note field that would may or may not be presented in the life story or commemorative video. Additional information may also be included.

Figure 5:
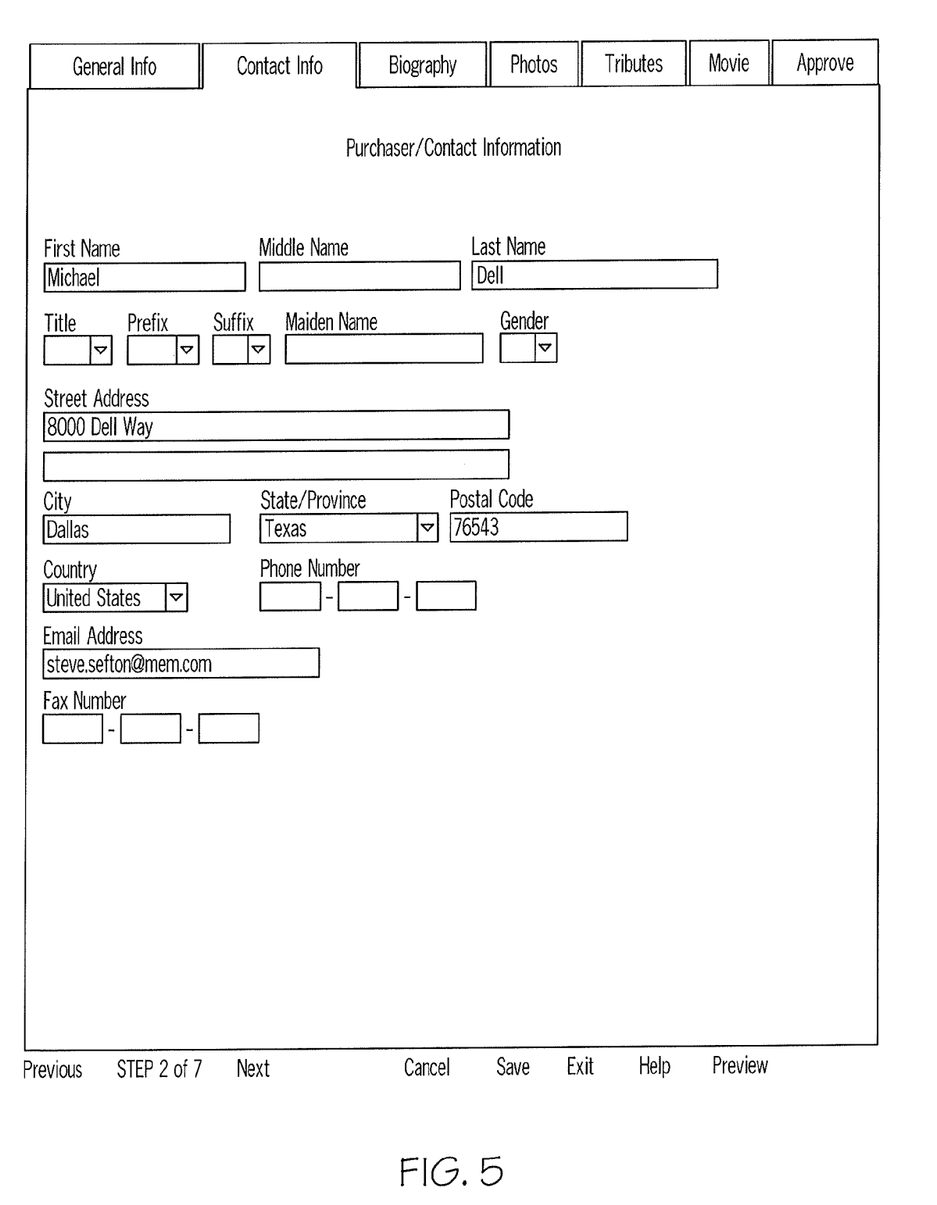
FIG. 5 illustrates a screen shot of Contact Info view of a data entry tool.

FIG. 5 illustrates the Contact Info screen. This screen is generally intended to be presented to the customer (36). Information includes the customer's (36) name, address and other contact information. Optionally, but not shown in this embodiment, payment information for the customer (36) may also be provided, such as the preferred method of payment and possibly credit card information. Additional information may also be included.

Figure 6:
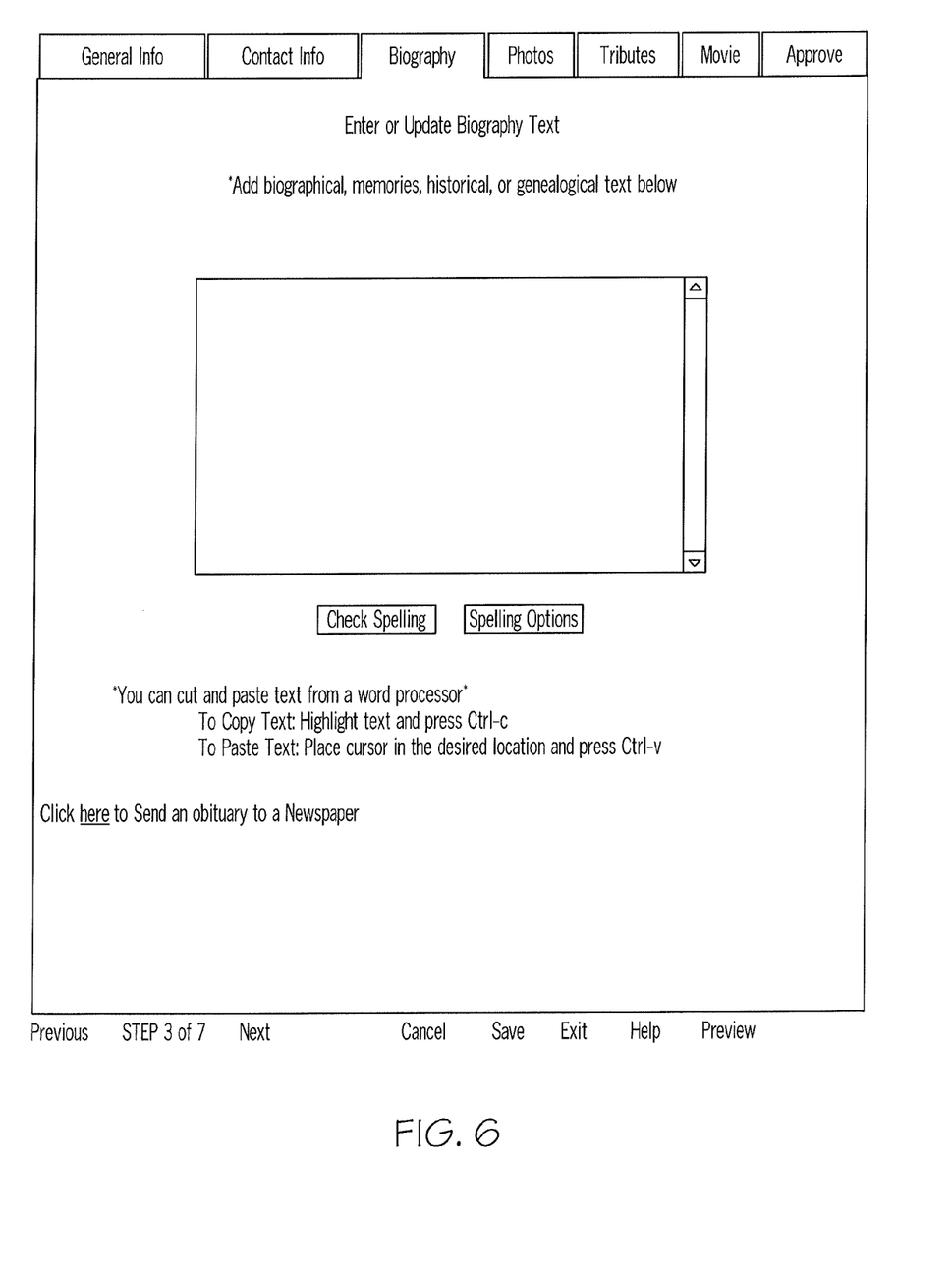
FIG. 6 illustrates a screen shot of Biography view of a data entry tool.

FIG. 6 illustrates the Biography screen. In the present example, the biography is a free form text field intended for biographical memories, historical, genealogical, affiliations and other such text related to the deceased person. The data entered in this field can be used in the commemorative video or in other commemorative presentations for the deceased person.

Figure 7:
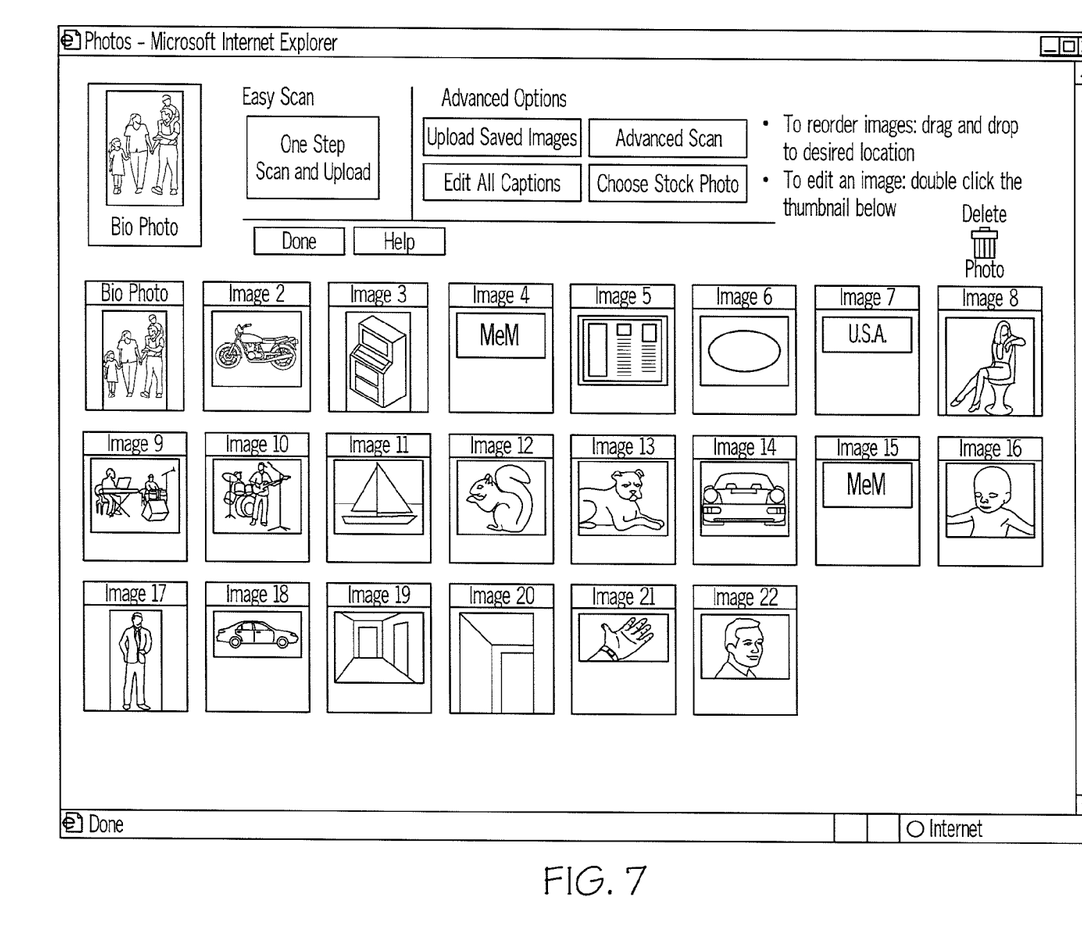
FIG. 7 illustrates a screen shot of Photos view of a data entry tool.

FIG. 7 illustrates the screen associated with the Photos tab. This screen includes a number of thumbnail representations of the images (42) shown in sequence. The sequence of images can be readily reordered by simply dragging and dropping an image relative to the other images in which case the screen will be reorganized accordingly. An image may be edited by selecting the corresponding thumbnail image. Likewise a photo may be deleted by selecting image and selecting the "Delete Photo" option. Images can be added and submitted using several different techniques. One option in the present embodiment is the "Easy Scan" option. Easy Scan provides a simple user interface for a user to scan images from a scanner connected to their local computer. The single click Easy Scan option activates an ACTIVE X controller loaded on the local computer that interfaces with the scanner interface (sometimes called a "TWAIN"). The controller automatically directs the scanner interface to scan a photograph or document on the scanner bed with predetermined image manipulation, such as reducing image resolution (e.g. 266 dpi), cropping the scanned image only to cover the document loaded on the bed, deskewing the scanned image, and providing color correction. The controller then automatically uploads it to the scanned image to the server (32) to be stored as an image (42) in the datastore (40). The scanned image will then appear as the next thumbnail image on the screen. Accordingly, the Easy Scan button provides a very simple user interface in which even the least sophisticated computer user can scan and upload images.

FIG. 7 also provides several other options for uploading images. The "Upload Saved Images" option opens a file navigation screen in which the user can browse through directories and files on the local computer for selection and uploading onto the datastore (40). The "Advanced Scan" option will also trigger the ACTIVE X controller, however, will present the user a variety of scan and upload options on their local computer. Accordingly, the "Advance Scan" option is well suited for more sophisticated users. The "Edit All Captions" option performs the function of allowing the user to efficiently enter captions for multiple images. The "Choose Stock Photo" option presents the user with a variety of stock photos that may be selected and included as an image (42).

Figure 8:
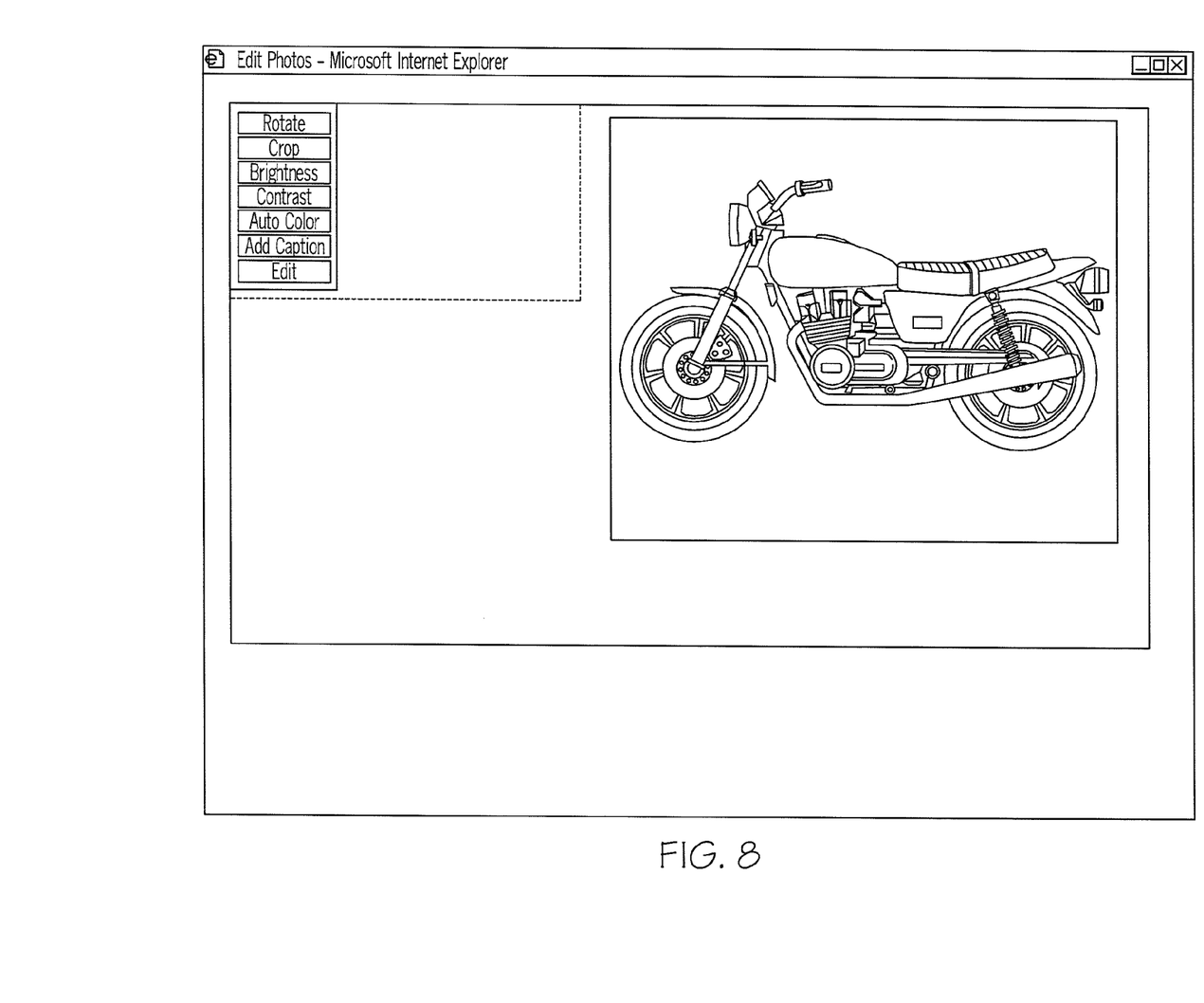
FIG. 8 illustrates a screen shot of Photo Edit view of a data entry tool.

The screen shown in FIG. 8 is presented upon selecting the thumbnail image. This provides the user some photo editing options for the selected image. In the present example, the photo editing options include Rotate, Crop, Brightness, Contrast, Auto-Color correction, and Addition of Text. Upon selecting Exit, the modified image is saved in the datastore (40) and the screen returns to FIG. 7 with an updated thumbnail.

Figure 9:
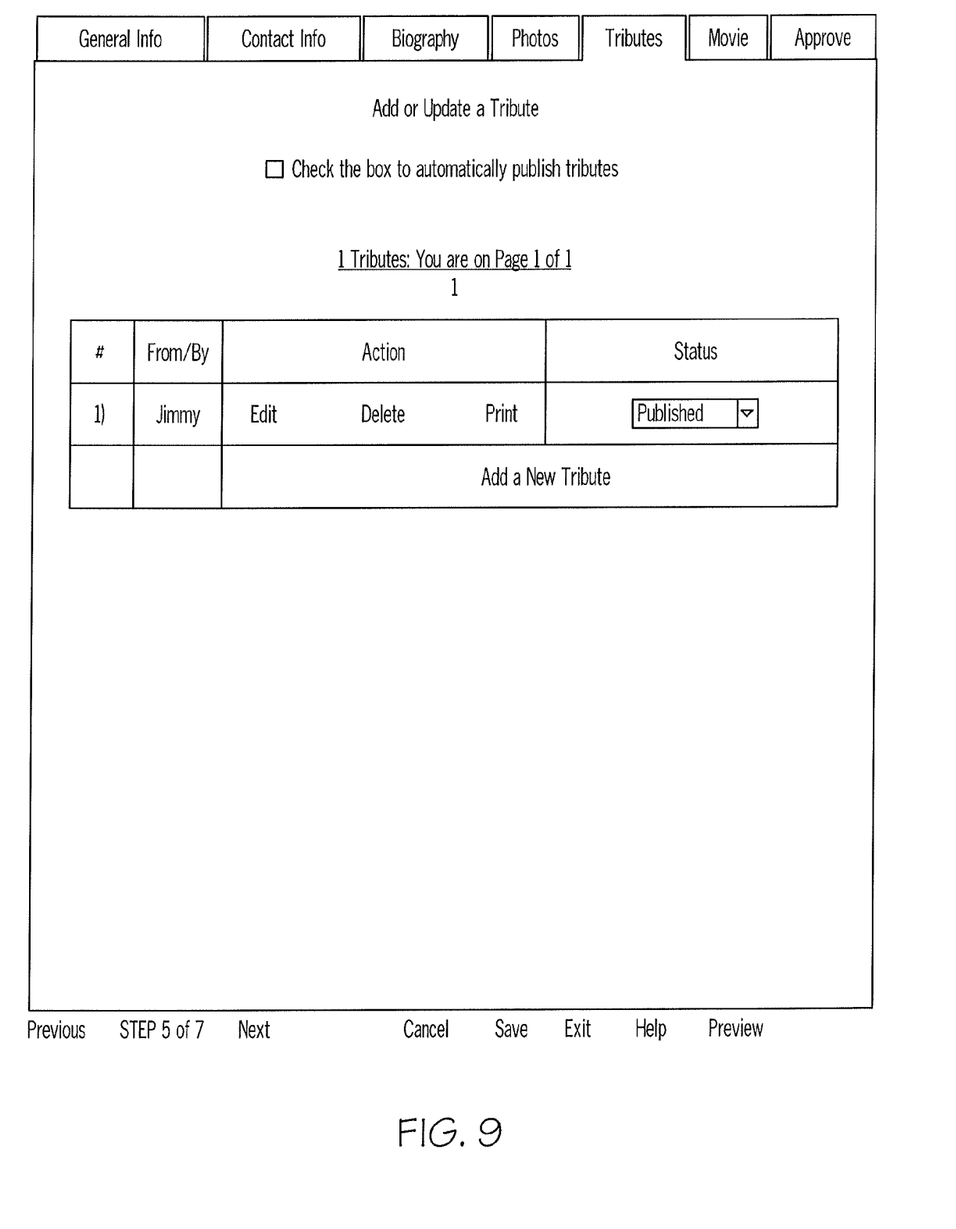
FIG. 9 illustrates a screen shot of Tributes view of a data entry tool.

FIG. 9 illustrates the screen associated with the "Tributes" tab. The Tributes screen allows the user to view and manage textual tributes posted for the deceased person. In the present example only a single tribute from Jimmy has been posted, however, it is contemplated that multiple tributes could be listed in the table. Associated with each tribute is the options to edit, delete or print the tribute. The status option allows the user to publish or keep private the corresponding tribute.

Upon selecting the Add New Tribute option, a dialogue screen is presented in which an additional textual tribute may be added to the collection. The tributes may be included in a commemorative video or other commemorative presentation for the deceased.

Figure 10:
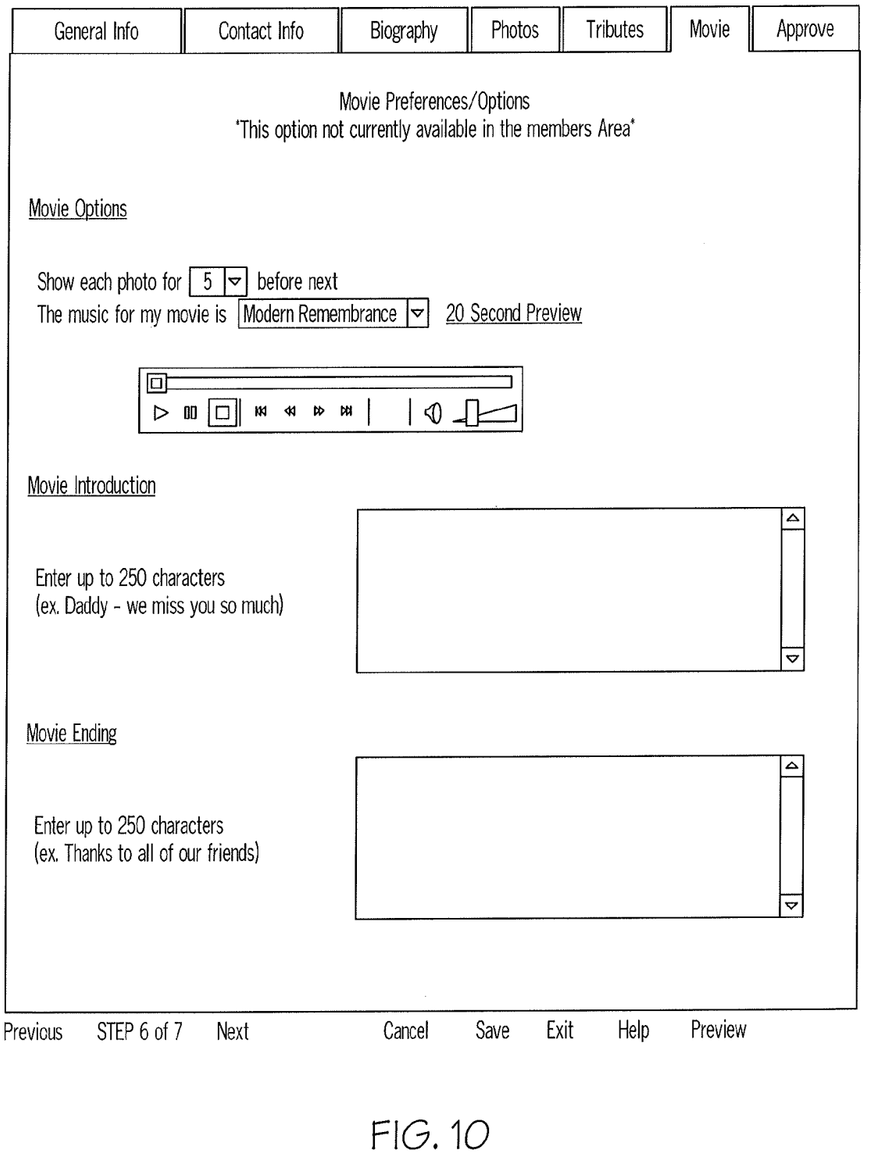
FIG. 10 illustrates a screen shot of Movies view of a data entry tool.

FIG. 10 illustrates the "Movie" screen. The Movie screen relates to display options that would go into the commemorative video and stored as configuration data (44). Some of those options include the number of seconds for the transition between each of the various images. In this embodiment, one can also select background music, including a twenty-second preview in which the user can listen to the music. The present embodiment also includes memorial introduction data entry field in which up to 250 characters of text may be entered, but more characters may also be employed. That text would be presented in the memorial introduction (60) in creating the commemorative video (68). Similarly, the memorial ending text field includes up to 250 characters that would appear in the memorial ending (64).

Figure 11:
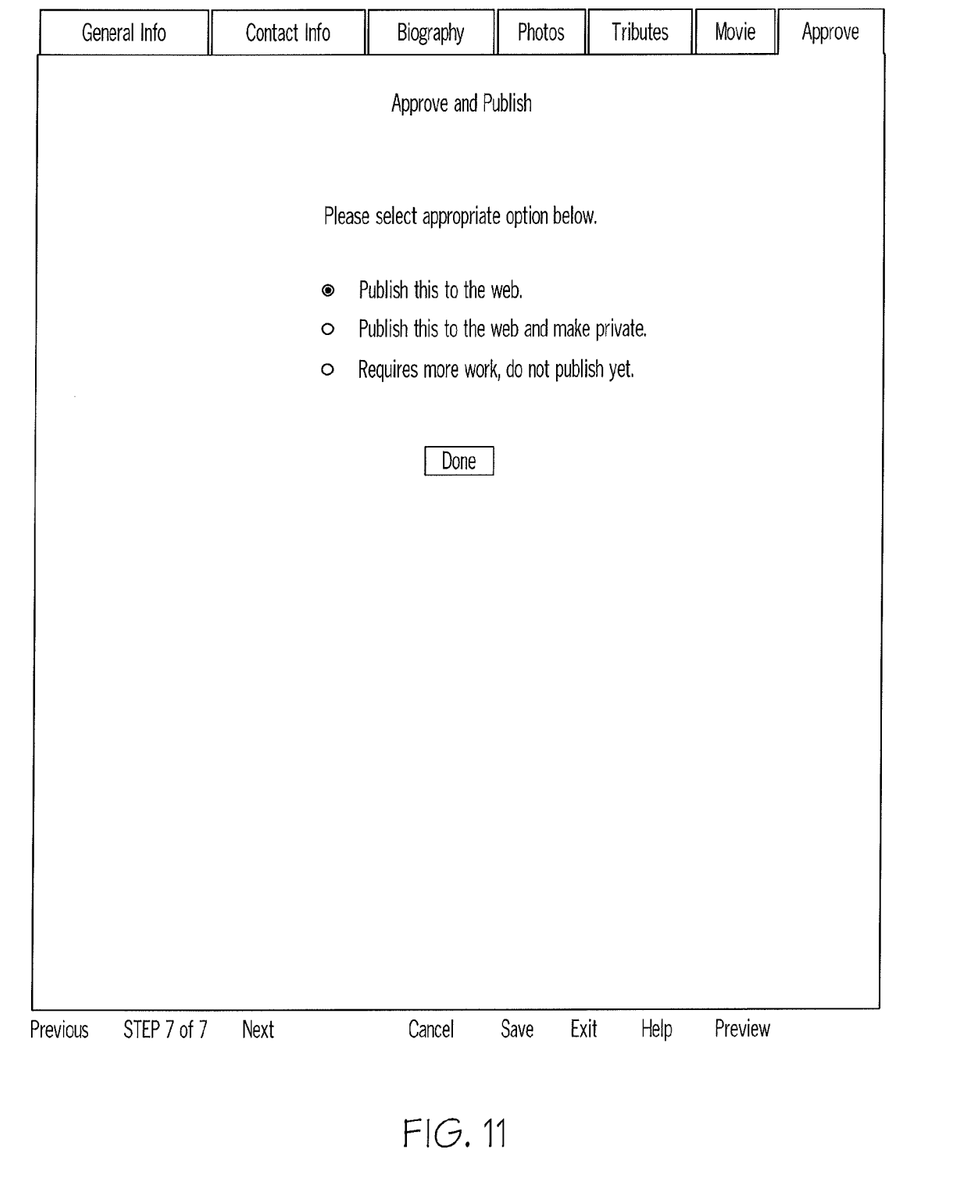
FIG. 11 illustrates a screen shot of Approve view of a data entry tool.

FIG. 11 illustrates the "Approve" screen. In this screen the user may select between publishing the information managed within the DE Tool to the Internet, publishing that information to the Internet but making it private and password protected, or holding the information for subsequent editing.

Having shown and described various embodiments of the present invention, further adaptations of the methods and systems described herein can be accomplished by appropriate modifications by one of ordinary skill in the art without departing from the scope of the present invention. Several of such potential modifications have been mentioned, and others will be apparent to those skilled in the art. For instance, the teachings of the present invention can be readily applied outside the death care industry. For instance, the teachings of the present invention may be also employed to create videos for any entity, whether living or dead. Likewise, the present invention may be employed to create videos unrelated to people, such as of organizations, companies, cities, causes, and the like. Accordingly, the scope of the present invention should be considered in terms of the following claims and is understood not to be limited to the details of structure and operation shown and described in the specification and drawings.

What is claimed is:

1. A method of creating a user-defined commemorative presentation, the method comprising the acts of:
   a) compiling a plurality of images related to a subject, wherein a person related to the subject compiles the plurality of images wherein at least a portion of the plurality of images are received by a server electronically, from a client, via a telecommunications network;
   b) creating configuration data relating to the display of the plurality of images, wherein the person related to the subject creates the configuration data by performing acts of:
      (i) selecting one or more configuration templates to apply to the plurality of images, and
      (ii) modifying the one or more configuration templates, wherein the act of modifying the one or more configuration templates includes the person related to the subject performing acts of:
         (A) selecting an order and duration for displaying the plurality of images, and
         (B) adding personalized text to accompany at least one of a selected image of the plurality of images;
   c) storing the plurality of images and configuration data on the server, wherein at least a portion of the plurality of images are stored as individual electronic files in a datastore on the server, wherein a plurality of images relating to a plurality of other subjects are also stored as individual electronic files in the datastore, on the same server as the plurality of images related to the subject;
   d) creating a video by accessing the plurality of images stored in the datastore and the configuration data and sequentially displaying the plurality of images stored in the datastore in conformance with the configuration data, wherein the act of accessing the plurality of images stored in the datastore comprises accessing each of the corresponding individual electronic files stored on the server in the datastore; and
   e) displaying the video to commemorate the subject, wherein the act of displaying the video comprises streaming the video from the server to the client via the Internet.

2. The method of claim 1, further comprising the act of storing the video on a video medium.

3. The method of claim 2, wherein the video medium comprises one or more of the following: video tape, compact disc (CD), or digital video disc (DVD).

4. The method of claim 1, wherein the act of displaying further comprises preloading the video, wherein the act of preloading the video comprises playing a first portion of the video while creating a second portion of the video.

5. The method of claim 1, wherein the subject is a deceased person and the video is displayed during the funeral service of the deceased person.

6. The method of claim 5, wherein the video is replayed after the funeral service has concluded from a web site on an Internet browser.

7. The method of claim 5, wherein the act of compiling comprises scanning photographs at a funeral home and uploading the scanned photographs to the datastore.

8. The method of claim 7, wherein the video is created on a remote server to the funeral service.

9. The method of claim 8, wherein the video is transmitted to the funeral home over the Internet.

10. The method of claim 9, wherein the displayed video is streamed from the server.

11. The method of claim 9, wherein the video is downloaded from the server.

12. The method of claim 8, further comprising the act of transmitting via the Internet the plurality of images from the funeral home to the server.

13. A business method comprising offering and selling the acts in the method of claim 5 in conjunction with funeral services of a funeral home.

14. The business method of claim 13, further comprising the act of selling the video stored on a video medium.

15. The method of claim 1, wherein the video is in a format selected from the group consisting of MACROMEDIA FLASH, SHOCRWAVE, DIRECTOR, MPEG, AVI, ASF, REAL MEDIA, QUICKTIME, and DVD.

16. The method of claim 1, wherein the plurality of images are still or video images.

17. The method of claim 1, wherein the configuration data defines one or more of the following:
    the type of transition of the images in the video;
    panning of the images in the video;
    zooming of the images in the video;
    framing of the images in the video.

18. The method of claim 1, wherein the configuration data defines one or more of the following:
    music to be played in the video;
    background appearance in the video.

19. The method of claim 1, wherein the configuration data defines one or more of the following:
   one or more introduction screens in the video;
   one or more ending screens in the video;
   descriptive text of the images in the video.

20. The method of claim 1, wherein the acts are performed sequentially.

21. A computer system programmed to perform the method of claim 1.

22. A computer readable medium comprising instructions for performing the method of claim 1.

23. A video created using the method of claim 1.

24. A method in conjunction with funeral services, the method comprising steps of:
   a) creating identifying data for a plurality of deceased persons, the identifying data being unique to each deceased person;
   b) compiling a plurality of images and a plurality of tributes related to each of the plurality of deceased persons, wherein each image of the plurality of images and each tribute of the plurality of tributes is associated a particular deceased person of the plurality of deceased persons, with the identifying data being unique to the particular deceased person, wherein each one of the images is represented by a respective individual electronic file, wherein the images and tributes are received by a server from a one or more submitting clients;
   c) creating configuration data for each of the plurality of deceased persons, wherein the configuration data corresponds to a plurality of video display options relating to the sequence and presentation of the plurality of images and the plurality of tributes;
   d) for each of the plurality of deceased persons, storing in a datastore on the server the individual electronic files corresponding to the plurality of images and the plurality of tributes, configuration data, and identifying data;
   e) creating a commemorative video for the selected deceased person in response to a user submitting a request via a requesting client by accessing and sequentially displaying the corresponding plurality of images and the corresponding plurality of tributes stored in the datastore on the server in conformance with the corresponding configuration data and identifying data; and
   f) displaying the video, on the requesting client, during the funeral service of the selected deceased person, wherein the act of displaying the video comprises streaming the video from the server to the requesting client via the Internet.

25. The method of claim 24, wherein the identifying data comprises numeric data.

26. The method of claim 24, wherein the identifying data comprises at least a portion of the name of the corresponding deceased person.

27. The method of claim 24, further comprising the act of selling the video stored on a video medium.

28. The method of claim 24, further comprising the act of creating commemorative videos accessible over the Internet after the funeral service.

29. A method of claim 24, further comprising the acts of offering and selling the acts in the method in conjunction with funeral services of a funeral home.

30. The method of claim 24, wherein the plurality of video display options comprise:
   the sequence of images to be displaying in the video;
   the time period between image transitions in the video;
   the type of transition of the images in the video;
   panning of the images in the video;
   zooming of the images in the video;
   framing of the images in the video;
   music to be played in the video;
   background appearance in the video;
   one or more introduction screens in the video;
   one or more ending screens in the video; and
   descriptive text of the images in the video.

31. The method of claim 24, wherein the plurality of images are still or video images.

32. The method of claim 24, wherein the acts are performed sequentially.

33. The method of claim 24, wherein the one or more of the acts are performed at least in part simultaneously.

34. A computer system programmed to perform the method of claim 24.

35. A computer readable medium comprising instructions for performing the method of claim 24.

36. A method of preparing a commemorative presentation of a deceased person, the method comprising:
   a) accessing a website over the Internet, wherein the website comprises a data entry tool located on a server, wherein the data entry tool comprises a plurality of tabs, wherein the plurality of tabs comprise one or more fields for data entry;
   b) entering information in the one or more fields, wherein the information includes general information, contact information, and biography information;
   c) editing one or more photos and one or more narrations, wherein at least a portion of the photos and narrations were uploaded to the server by a third party, wherein the act of editing comprises selecting configuration data relating to the sequence and presentation of the one or more photos and the one or more narrations, wherein the configuration data is configured to play an audio file as the one or more photos are presented; and
   d) publishing the commemorative presentation, wherein the act of publishing comprises selecting an option to publish within one of the plurality of tabs of the data entry tool.

* * * * *